UNITED STATES PATENT OFFICE.

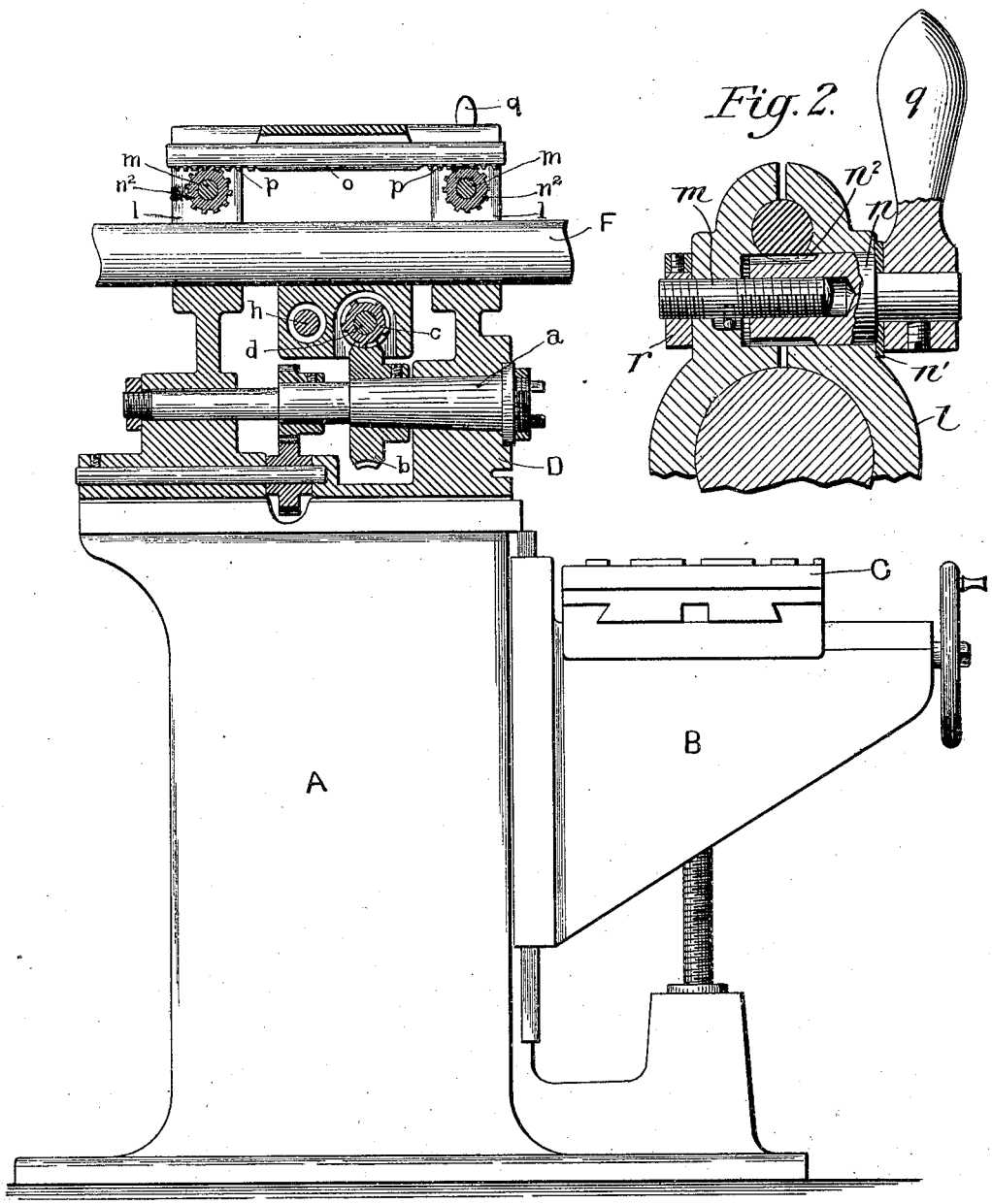

JOHN PARKER, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

MILLING-MACHINE.

No. 806,910. Specification of Letters Patent. Patented Dec. 12, 1905.

Application filed May 8, 1902. Serial No. 106,398.

*To all whom it may concern:*

Be it known that I, JOHN PARKER, of the city and county of Providence, State of Rhode Island, have invented certain new and useful Improvements in Milling-Machines; and I do hereby declare the following specification, taken in connection with the accompanying drawings, forming a part of the same, to be a full, clear, and exact description thereof.

Milling-machines are usually provided with an arm adjustably mounted in bearings in the spindle-head above the spindle and parallel thereto. This arm, known as the "center-bearing" arm, is employed to support or assist in supporting an outboard bearing for the cutter-arbor or for supporting some other attachment which coöperates with the spindle.

It is the object of the present invention to provide means for quickly and conveniently clamping the center-bearing arm in its bearings after it has been adjusted into the desired relation to the spindle.

In practicing the invention clamping devices are provided for clamping the arm in each bearing and are so connected that both clamping devices may be simultaneously operated by a single operating device. Means are also provided for adjusting or regulating the clamping relation between the clamping devices, so that they may be brought into and maintained in proper relation to secure an efficient clamping action at each bearing, such as is requisite for the practical and satisfactory operation of the clamping devices.

The features and combinations comprising the invention will be understood from the following detailed description of the mechanism in which I have embodied them and will be set forth in the claims.

Referring to the drawings, Figure 1 is an elevation of a milling-machine embodying the invention, the machine shown being one in which the spindle is provided with a worm-drive, the head of the machine being shown in section; and Fig. 2 is a detail on an enlarged scale.

A represents the frame or standard of the machine, B the knee, and C the table.

D is the spindle-head, in which the spindle $a$ is mounted to revolve in suitable bearings. As shown in Fig. 1, the spindle $a$ is adapted to be revolved by means of a worm-gear $b$ and worm $c$, said worm-gear being secured to the spindle. The worm $c$ is secured to a shaft $d$, mounted in bearings in the spindle-head, said shaft $d$ being at right angles to the spindle $a$. A sleeve $e$ is loosely mounted on the worm-shaft $d$, to which sleeve the driving-pulley E is secured, said driving-pulley being shown in the drawings as a cone-pulley. The revolution of the pulley E serves to turn the sleeve $e$ on the worm-shaft $d$. The sleeve $e$ is provided at one end with a pinion $f$, which engages a gear $g$, secured to a shaft $h$, mounted in bearings parallel with the worm-shaft $d$. To the other end of the shaft $h$ is removably secured a gear $i$, which engages a gear $k$, removably secured to the inner end of the worm-shaft $d$.

Referring to the drawings, F represents a portion of the usual overhanging or center-bearing arm of a milling-machine. This arm is usually mounted in two bearings in the spindle-head, and it is desirable that said arm should be securely clamped in both of these bearings. In the drawings is shown an arrangement whereby said arm may be simultaneously clamped in both bearings by means of a single operating handle or lever. The overhanging arm F is mounted in two split bearings $l$ $l$, each of which is adapted to be clamped about the arm F by clamp-bolts $m$ $m$. Each clamp-bolt projects through one ear of the split bearing and is adapted to be engaged by a nut $n$, provided with a projecting head or flange $n'$, arranged to bear against the other ear of the split bearing. Each of these nuts $n$ is provided with elongated gear-teeth $n^2$ upon its periphery. Mounted to slide in suitable bearings is a rod or bar $o$, which is provided near each end with rack-teeth $p$, adapted to engage the teeth on the nuts $n$. One of the nuts $n$ is provided with an operating handle or lever $q$ for turning the same. With this construction it will be seen that by turning the handle $q$ both nuts $n$ will, by means of the connecting rack-bar $o$, be turned upon their bolts, and thus the overhanging arm will be simultaneously clamped in both its bearings and by means of a single operating handle or lever. The bolts $m$ $m$ may be provided with heads integral therewith; but it is preferred to provide each of said bolts with an adjustable head or nut $r$, whereby the necessary adjustment for wear, &c., may be made without disturbing or varying the position to which the handle $q$ is to be brought when the arm is clamped.

What I claim as my invention, and desire to secure by Letters Patent, is—

1. A milling-machine having in combination, a spindle-head, a cutter-spindle mounted therein, bearings parallel with the spindle, a center-bearing arm mounted in said bearings, a clamping device for clamping the arm in each bearing, and a manually-operated device for simultaneously operating both clamping devices, and means for adjusting the clamping relation between said devices, substantially as described.

2. A milling-machine having in combination, a spindle-head, a cutter-spindle mounted therein, bearings parallel to the spindle, a clamping nut and bolt for each bearing, and a manually-operated device for simultaneously operating said clamping devices, and means for adjusting the clamping action of each nut and bolt with relation to the other, substantially as described.

3. A milling-machine having in combination, a spindle-head, a cutter-spindle mounted therein, bearings parallel with the spindle, a center-bearing arm mounted in said bearings, a clamping nut and bolt for each bearing, a single manually-operated device connected with one of the screw-threaded parts for each bearing, and means for adjusting one or more of the screw-threaded parts independently of the manually-operated device, substantially as described.

4. A milling-machine having in combination a spindle-head, cutter-spindle mounted thereon, bearings parallel with the spindle, a center-bearing arm mounted in said bearings, a clamping-bolt for each bearing, a clamping-nut for each bearing, a lever connected with one of the screw-threaded parts for the front bearing, gear-teeth formed on said part, gear-teeth formed on the corresponding part of the rear bearing, and a toothed rack-bar engaging the gear-teeth on said parts, substantially as described.

5. A milling-machine having in combination a spindle-head, a cutter-spindle mounted therein, bearings parallel with the spindle, a center-bearing arm mounted in said bearings, a clamping-bolt for each bearing, a nut coöperating with each bolt, a single device connected to simultaneously operate both nuts, and adjusting-nuts on the bolts, substantially as described.

6. A milling-machine having in combination a spindle-head, a cutter-spindle mounted therein, bearings parallel with the spindle, a center-bearing arm mounted in said bearings, bolts $m$ for each bearing, nuts $n$ provided with gear-teeth, a rack-bar $o$ connecting said nuts, and a lever $q$ secured to the nut $n$ for the front bearing, substantially as described.

JOHN PARKER.

Witnesses:
W. H. THURSTON,
J. H. THURSTON.